July 26, 1960 — A. K. HINCHMAN — 2,946,531
MOTION-PICTURE FILM WINDER AND EDITOR
Filed Aug. 27, 1957 — 2 Sheets-Sheet 1

INVENTOR.
ALVA K. HINCHMAN
BY Robert K. Youtie
ATTORNEY.

July 26, 1960    A. K. HINCHMAN    2,946,531
MOTION-PICTURE FILM WINDER AND EDITOR
Filed Aug. 27, 1957    2 Sheets-Sheet 2

INVENTOR.
ALVA K. HINCHMAN
BY
ATTORNEY.

United States Patent Office 2,946,531
Patented July 26, 1960

2,946,531

MOTION-PICTURE FILM WINDER AND EDITOR

Alva K. Hinchman, 2 Rugby Road, Bryn Mawr, Pa.

Filed Aug. 27, 1957, Ser. No. 680,482

7 Claims. (Cl. 242—55.12)

This invention relates generally to devices for operating upon motion-picture film, and is especially adapted for use in the editing of motion-picture film, including cutting, splicing and the like, and also for use in the rapid rewinding of motion-picture film.

As is well known in the motion-picture industry, the requirements for a satisfactory film winder are quite different from those of a film editor, so that it has heretofore not been found practicable to provide a single device for accomplishing both of these operations. For example, film winding and editing are performed at very different film speeds, the latter being necessarily relatively slow and the former desirably fast. In addition, film editing requires substantially instantaneous stopping of the film at any selected point thereof, as well as frequent and rapid starts, without the development of undue slack in the film, and with limited stress imposed on the film.

Accordingly, it is one object of the present invention to provide a device for use in editing and winding of motion-picture film which completely satisfies all of the above-mentioned requirements, is extremely simple and durable in construction and operation, and which can be manufactured and sold at a reasonable cost.

Other objects of the present invention will become apparent upon reading the following specification and referring to the accompanying drawings, which form a material part of this disclosure.

The invention accordingly consists in the features of construction, combination of elements, and arrangements of parts, which will be exemplified in the construction hereinafter described, and of which the scope will be indicated by the appended claims.

Figure 1:
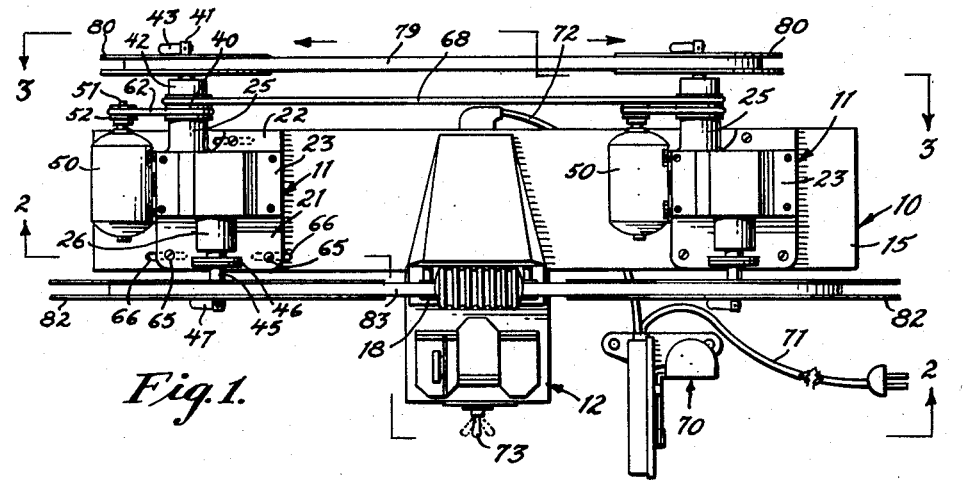
Figure 1 is a top plan view showing a film-winding and editing device constructed in accordance with the teachings of the present invention.
Figure 2:
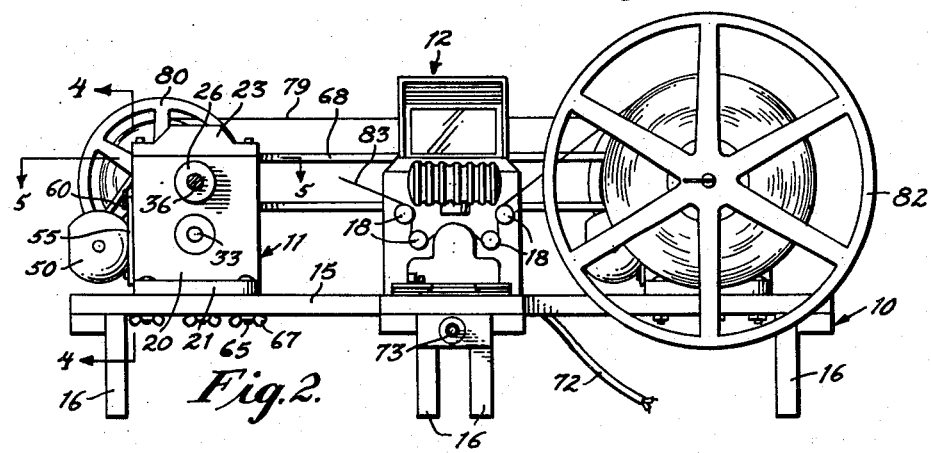
Figure 2 is a sectional elevational view taken substantially along the line 2—2 of Figure 1.
Figure 3:
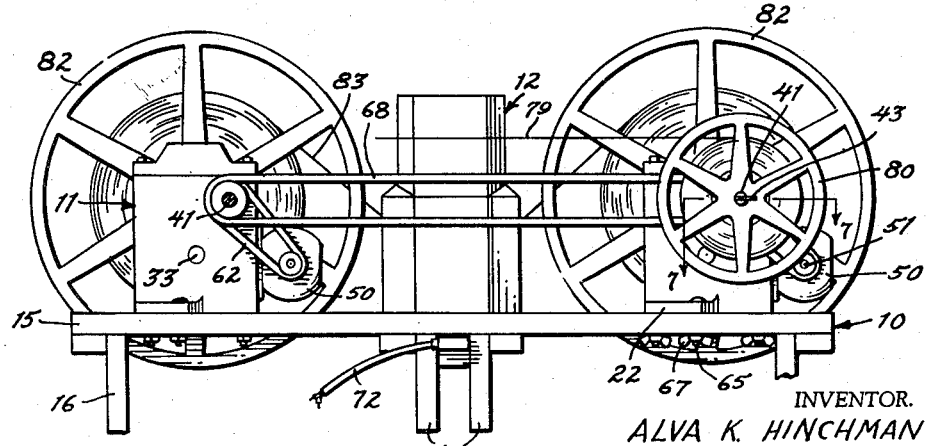
Figure 3 is a sectional elevational view taken substantially along the line 3—3 of Figure 1.

Referring now more particularly to the drawings, and specifically to Figures 1–3 thereof, the apparatus illustrated therein comprises generally a base 10, a pair of substantially identical units 11 mounted at spaced locations on the base, and an editing viewer and splicer 12 mounted on the base between the units 11.

More specifically, the base 10 may include a generally flat, normally horizontally disposed bed or table 15 of elongate rectangular configuration, provided with spaced legs 16 depending from its underside for engagement with an appropriate supporting surface. The editing viewer and splicer 12 may be conventional and is located generally medially of the elongate base plate 15. Further, the viewer and splicer 12 is arranged on the base plate 15 to face forward therefrom, as best seen in the front view of Figure 2. Suitable guide rolls 18 are provided on the viewer and splicer 12 for properly guiding film being edited.

As both of the operating units 11 are substantially identical, a detailed description of one will suffice. The left-hand unit 11 in Figures 1 and 2 includes an upstanding hollow housing 20 of generally rectangular configuration and having front and rear bottom flanges 21 and 22 seated on the upper surface of the base plate 15 for securement thereto. The housing 20 further includes generally vertically disposed, rectangularly arranged front, rear and side walls, and a cover or top 23 removably secured in position extending across the upper end of the front, rear and side walls. Projecting rearward from the rear housing wall is a generally horizontally disposed rear journal bearing 25, while a generally horizontally disposed front journal bearing 26 projects forward from the front housing wall in offset relation with respect to the rear journal bearing.

Figure 5:
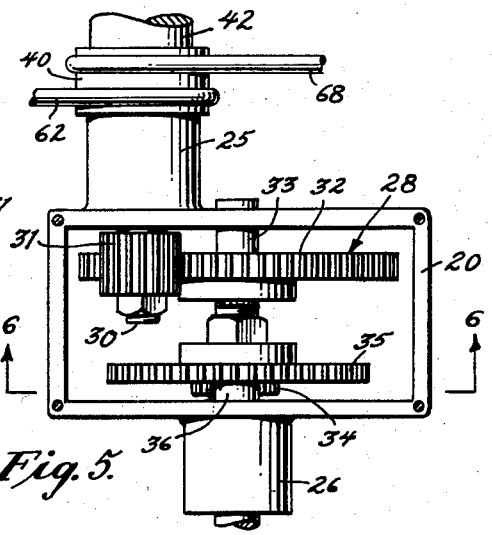
Figure 5 is a sectional horizontal view taken substantially along the line 5—5 of Figure 2.
Figure 6:
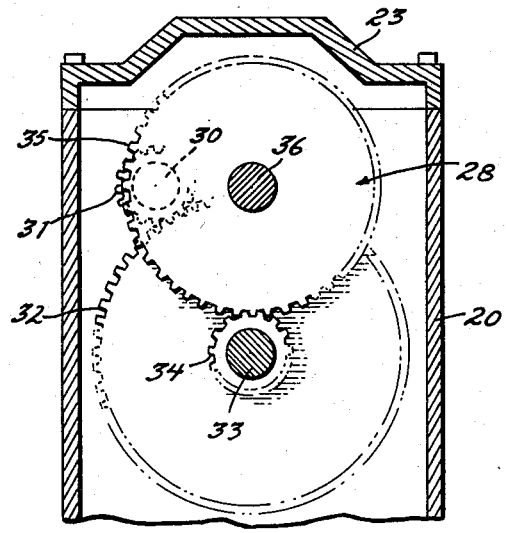
Figure 6 is a sectional elevational view taken substantially along the line 6—6 of Figure 5.

Located interiorly of the housing 20 is a speed-reduction gear train 28, best seen in Figures 5 and 6. It will there be noted that a shaft 30 is journaled in the bearing 25, extending forward into the housing 20 and rearward beyond the journal bearing. Keyed on the inner end of the shaft 30, interiorly of the housing 20, is a pinion 31. A relatively large spur gear 32 is arranged within the housing 20 in meshing engagement with the pinion 31 and rotatably mounted in the housing on a generally horizontally disposed, forwardly and rearwardly extending shaft 33 having its opposite ends journaled in the front and rear housing walls. Keyed to the shaft 33 for rotation with the relatively large gear 32 is a pinion 34, which is located forward of the latter gear. An additional relatively large gear 35 is located interiorly of the housing 20 in meshing engagement with the pinion 34, and is carried by a shaft 36 which extends forward through and is journaled in the front-wall bearing 26. It will now be appreciated that the shaft 30 of the gear train 28 is the high-speed shaft, and that the shaft 36 is the low-speed shaft. In practice, a ratio between the shafts 30 and 36 of about 32 to 1 has been found satisfactory.

Figure 7:
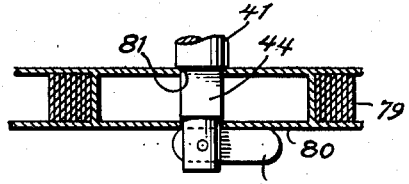
Figure 7 is a fragmentary horizontal sectional view taken substantially along the line 7—7 of Figure 3.

Keyed on the high-speed shaft 30 for rotation therewith, rearward of the journal bearing 25, is a double or two-groove pulley 40; and, an axial shaft extension 41 is connected, as by a coupling 42, to the rear end of the shaft 30 and projects rearward therefrom. In Figure 7 it may be seen that the shaft extension 41 is provided with a noncircular portion 44, for a purpose appearing presently, and is further provided with a pivotal latch or holding member 43. A similar axial extension 45 is coupled at 46 to the forward end of shaft 36, projecting forward therefrom, which extension is also provided with a noncircular portion (not shown), and a pivoted latch or holding member 47.

On one vertical side wall of the housing 20, the left-hand side wall as seen in Figures 1 and 2, is mounted an electric motor or other suitable drive means 50. The motor 50 extends generally horizontally, having its drive shaft 51 projecting rearward and provided with a drive pulley 52.

Figure 4:
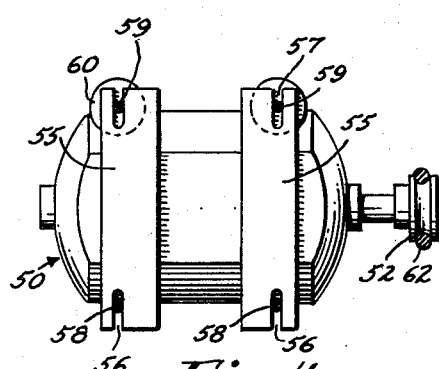
Figure 4 is a sectional elevational view taken substantially along the line 4—4 of Figure 2.

In order to mount the motor 50 on the housing 20, a pair of generally vertically disposed plates 55 are fixedly secured to the motor and disposed in bearing engagement with the external surface of the adjacent housing side wall. As best seen in Figure 4, the plates 55 are each provided with a pair of vertically spaced, vertically extending slots or cutouts, the lower one being designated 56 and the upper one 57. A headed fastener, pin, or screw 58 extends through each lower slot 56 into the adjacent housing wall for securement therein; and, an additional headed pin, fastener, or screw 59 extends through each of the upper plate slots 57 in threaded engagement into the adjacent housing wall. The fasteners 59 are preferably provided with relatively large heads 60 for manual rotation thereof. By this mounting arrangement, the fasteners 59 may be withdrawn slightly from the adjacent housing wall to permit vertical shifting movement of the motor 20, the fasteners being slidably received in their respective slots; and, the motor may be locked in any selected position of vertical movement by securement of the fasteners 59 to clamp the fastener heads 60 firmly against the respective plates 55. A flexible endless belt 62 is trained over the motor drive pulley 52 and the adjacent pulley 40 to drive the adjacent gear train 28. By the above-described adjustable motor-mounting means, the tension of the belt 62 may be adjusted to any desired value.

As thus far described, the units 11 may be substantially identical, so that like reference numerals designate like parts in the right-hand unit 11 of Figures 1 and 2.

By way of difference, the motors 50 of the right- and left-hand units 11 are preferably wound for energized rotation in opposite directions, the left-hand motor rotating counterclockwise and the right-hand motor rotating clockwise, as viewed from the front. Further, by way of difference in the units 11, at least one of such units is preferably mounted on the base 10 for adjustable positioning toward and away from the other unit. Hence, the left-hand unit 11 is provided with fasteners 65 extending through the flanges 21 and 22, and thence through elongate slots 66 in the base plate 15, on the other side of which they are provided with wing nuts 67. Thus, the left-hand unit 11 is adjustably positionable toward and away from the right-hand unit 11. For quick adjustment of the tension on belt 68, the left-hand unit 11 may be mounted on suitable antifriction bearings, either ball or roller.

An endless flexible belt 68 is trained over the pulleys 40 of the high-speed shafts 30; and, the adjustable positioning of at least one unit 11, as described hereinbefore, affords means for varying the tension of belt 68. For reasons appearing more fully hereinafter, the tension of belt 68, and its consequent degree of slippage on pulleys 40, is an important feature of the instant invention.

In Figure 1 is also shown a treadle, generally designated 70, connected in circuit with a supply line 71 adapted for connection to a power source, and a wire 72 connected to the motors 50 through the switch 73.

Figure 8:
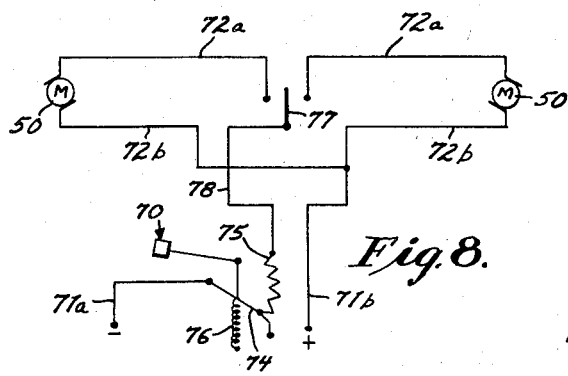
Figure 8 is a diagrammatic representation of the electrical system of the instant apparatus.

The electrical circuit is illustrated in Figure 8, wherein the supply-line conductors are designated 71a and 71b, the former being connected through a swingable arm 74 to a variable rheostat 75 of the treadle 70. The rheostat arm 74 is spring biased, as by a spring 76 to its illustrated position and movable by actuation of the treadle. Extending from the treadle rheostat 75 is a conductor 78 which terminates in a double-throw switch 77. A conductor 72a extends from each terminal of the switch 77 to one side of a respective motor 50, and conductor 72b extends from the other side of the motors, respectively, to the supply line 71b. Hence, the switch 77 has three positions, namely (1) the open-circuit intermediate position illustrated, (2) a leftward position closing a circuit through the left-hand motor, and (3) a rightward position closing a circuit through the right-hand motor. When either of the motor circuits is closed, the associated motor may be operated by actuation of the treadle 70.

In Figures 1–3 it will be noted that a film reel 80 is mounted on the high-speed shaft 30 of each unit 11. This is best seen in Figure 7, wherein the film reel 80 is formed with a noncircular central aperture 81 conformably receiving the noncircular portion 44 of the shaft extension 41. The reels 80 may each be removed from and replaced upon their shaft extensions 41 by swinging the respective latch or holding member 43 to a position in alignment with its shaft extension. Additional swinging of the latch 43 to its illustrated position of Figure 7 serves to retain the reel 80 fixed on its shaft extension. A motion-picture film 79 is illustrated as extending between and having opposite end portions coiled about the respective reels 80.

The function of the reels 80 is to effect rapid winding of the film 79 from one reel to the other. As the reels 80 are mounted on the high-speed shafts 30, it is obvious that high-speed winding will be accomplished by energizing the motors 50 as described hereinbefore. That is, the motor 50 associated with the reel 80 upon which it is desired to wind the film is energized. As the reel 80 upon which it is desired to wind the film is driven from its associated motor 50 at substantially constant speed, or at a speed determined by the operator, it will be appreciated that the other reel 80 from which film is being unwound will necessarily have an angular velocity which varies with respect to that of the winding reel dependent upon the relative sizes of film coils on the respective reels. In order to accommodate for this variation in relative angular velocity of the reels 80, the belt 68 is sufficiently loose, or has sufficient slippage to permit the required variation.

Mounted on the low-speed shafts 36, in substantially the same manner as described hereinbefore in connection with the reels 80, are a pair of reels 82. Thus, the reels 82 are each mounted for rotation with its respective low-speed shaft. A film 83 to be edited extends between the reels 82, through the editor 12, and has its opposite end portions coiled about the respective reels 82. Obviously the film 83 will pass relatively slowly from one reel to the other upon energization of one of the motors 50; and, of course, movement of the film 83 may be reversed by energization of the other motor 50, as described hereinbefore in connection with Figure 8. Further, movement of the film 83 may be selectively stopped without the development of undue slack in the film, by de-actuation of the driving motor. Of course, the actuating motor may be de-actuated by opening of the switch 77, or by appropriate operation of the treadle 70. More specifically, stoppage and/or reversal of the film 83 may be accomplished by mere operation of the electrical circuit without the development of excess slack or stress in the film. This advantageous result is achieved by the yielding or impositive connection between the gear trains 28 of the belt 68. That is, the belt 68 has sufficient slippage on the pulleys 40 to allow for variations in relative angular velocities of the reels 82, in the same manner as described hereinbefore in connection with the reels 80, but has insufficient slippage to allow the development of undue slack or stress in the film upon stopping or reversing of the film movement. Of course, this desirable degree of tension in the belt 68 may be achieved by adjustment of the units 11 toward and away from each other.

From the foregoing, it is seen that the present invention provides a device for editing and winding motion-picture film which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a motion-picture film winder and editor, a base, a pair of spaced speed-reduction gear trains on said base each having a high-speed shaft projecting on one side and a low-speed shaft projecting on the other side, independently actuable drive means operatively connected to each of said high-speed shafts for driving the respective gear train, means for mounting a film reel on each of said low-speed shafts for rotation therewith, whereby a film is adapted to be wound from a reel on a selected one of said low-speed shafts to a reel on the other of said low-speed shafts by actuation of the drive means associated with said other low-speed shaft, and transmission means yieldably connected between said high-speed shafts for allowing variation in speed between said low-speed shafts required by the changing relative sizes of film coils on said reels.

2. In a motion-picture film winder and editor according to claim 1, said transmission means comprising a belt connected between said high-speed shafts having sufficient slippage to accommodate the differences in reel velocities and insufficient slippage to permit development of excessive slack in the film upon deenergization of the actuated drive means.

3. A motion-picture film winder and editor according to claim 1, in combination with means for mounting a film reel on each of said high-speed shafts for quick rewinding of motion-picture film.

4. In a motion-picture film winder and editor, a normally horizontally extending base, a pair of spaced-apart upstanding housings on said base, a pair of speed-reduction gear trains respectively mounted in said housings and each having a high-speed shaft projecting on one side of said base and a low-speed shaft projecting on the other side of said base, independently actuable drive means operatively connected to each of said high-speed shafts for driving the respective gear train, means for mounting a film reel on each of said low-speed shafts for rotation therewith, whereby a film is adapted to be wound from a reel on a selected one of said low-speed shafts to a reel on the other of said low-speed shafts by actuation of the drive means associated with said other low-speed shaft, and transmission means yieldably connected between said high-speed shafts for permitting variation in the relative speeds of said reels and hence of said gear trains as required by the changing relative sizes of film coils on said reels.

5. A motion-picture film winder and editor according to claim 4, each of said drive means comprising a motor adjacent to a respective one of said housings, a transmission belt connected between said motor and the high-speed shaft of the adjacent housing, and means mounting said motor on the adjacent housing for movement toward and away from the high-speed shaft of the adjacent housing for loosening and tightening said belt.

6. A motion-picture film winder and editor according to claim 5, said motor-mounting means each comprising a generally vertically disposed plate fixedly secured to the adjacent motor and disposed in facing engagement with the adjacent housing, said plate being formed with a pair of vertically extending slots, and a pair of pins projecting from said housing respectively through said slots to constrain said plate and hence said motor to vertical shifting movement, at least one of said pins being threaded into said housing and having an enlarged head for clamping engagement with said plate to fixedly secure the latter and its associated motor in a selected position of its vertical shifting movement.

7. A motion-picture film winder and editor according to claim 4, said transmission means comprising a belt connected between said high-speed shafts, at least one of said housings being shiftable along said base toward and away from the other of said housings for adjusting the tension of said belt to provide sufficient slippage for accommodating the required differences in reel velocities and insufficient slippage to permit development of excess slack in the film upon deenergization of the actuated drive means.

References Cited in the file of this patent
UNITED STATES PATENTS

| | | |
|---|---|---|
| 1,136,335 | Hetherington | Apr. 20, 1915 |
| 1,680,843 | Bechaud | Aug. 14, 1928 |
| 2,549,038 | Zenner | Apr. 17, 1951 |
| 2,721,040 | Grantham | Oct. 18, 1955 |
| 2,768,795 | Norton | Oct. 30, 1956 |